United States Patent [19]

Akao et al.

[11] Patent Number: 4,587,127
[45] Date of Patent: May 6, 1986

[54] PROCESS FOR PRODUCING LIQUID SEASONING

[75] Inventors: Takeshi Akao, Abiko; Shuichi Nagata, Chiba; Katsumichi Osaki, Noda; Yoshiharu Okamoto, Nagareyama, all of Japan

[73] Assignee: Kikkoman Corporation, Noda, Japan

[21] Appl. No.: 534,278

[22] Filed: Sep. 21, 1983

[30] Foreign Application Priority Data

Oct. 25, 1982 [JP] Japan .................... 57-186136

[51] Int. Cl.$^4$ .............................................. A23L 1/20
[52] U.S. Cl. ........................................ 426/46; 426/52; 426/60
[58] Field of Search ..................... 426/46, 52, 60

[56] References Cited

U.S. PATENT DOCUMENTS 4,009,286  2/1977  Moll et al. .
4,308,284  12/1981  Noda et al. .................... 426/46

OTHER PUBLICATIONS

Moulton et al.–J. Food Science, vol. 47 (1982), pp. 1127–1129.
Saio et al., J. Food Science, vol. 40 (1975), pp. 537–544.

*Primary Examiner*—Sam Rosen
*Attorney, Agent, or Firm*—Banner, Birch, McKie and Beckett

[57] ABSTRACT

A process for producing a liquid seasoning, which comprises allowing a hydrolyzate of soy sauce raw materials, in liquid state at a pH of 4.0 to 9.0, to contact with immobilized cells of soy sauce lactic acid bacteria for 30 minutes or more to obtain a lactic fermentation mixture, and subjecting the mixture to the fermentation by a soy sauce yeast.

9 Claims, No Drawings

PROCESS FOR PRODUCING LIQUID SEASONING

This invention relates to a process for producing a liquid seasoning. More particularly, it relates to a process for producing efficiently, in a short period of time, a liquid seasoning of excellent flavor and taste by utilizing immobilized cells of soy sauce lactic acid bacteria, which greatly enhance the efficiency of lactic fermentation.

In the conventional production of a seasoning such as soy sause, it has been a general practice to take a measure of inoculating and cultivating lactic acid bacteria in a mash for soy sauce or the like or directly adding lactic acid to the mash, as a means of improving the flavor of said seasoning as well as improving the fermentation efficiency of the yeast. However, in the former case a fermentation period as long as at least one week is required for the sufficient formation of lactic acid, while the latter procedure, although simple in its operation, has a defect of yielding a product distinctly inferior to that obtained in the former case.

An object of the present invention is to provide a process for the efficient production of a liquid seasoning of excellent flavor and taste in a short period of time from the raw materials for soy sauce, whereby the above difficulties of the prior art are alleviated.

According to the present invention, there is provided a process for producing a liquid seasoning, which comprises allowing a hydrolyzate of soy sauce raw materials, in liquid state at a pH of 4.0 to 9.0, to contact with immobilized cells of soy sauce lactic acid bacteria for 30 minutes or more to obtain a lactic fermentation mixture, and subjecting the mixture to the fermentation by a soy sauce yeast.

The fermentation by the soy sauce yeast can be carried out (1) by adding a soy sauce yeast to the above mixture resulting from the lactic fermentation and allowing the fermentation to proceed in a customary manner, or (2) by adding a soy sauce yeast to said lactic fermentation mixture, allowing the mixture to undergo fermentation for 3 hours or more, then while withdrawing the fermentation mixture form the fermenter at a rate to ensure an average retention time of 3 hours or more for the fermentation mixture in the fermenter, feeding continuously said lactic fermentation mixture so as to keep the volume of fermentation mixture in the fermenter at an approximately constant level, passing the withdrawn fermentation mixture through a filter to separate the mixture into a liquid portion containing the yeast cells and a liquid seasoning portion containing no yeast cells, and returning the former portion to the fermenter, or (3) by contacting said lactic fermentation mixture with immobilized cells of soy sauce yeast for one hour or more, and either passing or not passing the contacted mixture through a filter.

The invention is described below in detail.

The raw materials for the soy sauce production (hereinafter referred to briefly as raw materials) used in the present invention are those usually used in the production of soy sauce, which are proteinous materials admixed with starchy materials. As examples of suitable proteinous materials, there may be listed defatted soybean, whole soybean, wheat gluten, corn gluten, purified soybean protein, separated soluble protein, fish and shellfishes, meats, and yeast extracts. Examples of suitable starchy materials include wheat, barley and corn.

These raw materials are subjected to custormary raw material treatment such as softening of the tissue by cooking for example, heat denaturation of proteins, conversion of starch into α-form, and sterilization.

The hydrolyzate of raw materials can be obtained by enzymolysis or chemical hydrolysis. The enzymolysis of raw materials is performed either by the use of enzyme preparations or by the hydrolysis of raw materials in the form of soy sauce koji, though the former technique is preferred because of the ease of hydrolyzing operation. Examples of enzyme preparations suitable for use in the present process include enzyme solutions obtained by cultivating in a suitable medium yellow koji-molds such as, for example, *Aspergillus oryzae* and *Aspergillus sojae,* which are well-known koji-molds for soy sauce production, and molds of the genus Rhizopus, and extracting the culture with water or the like; and crude enzyme preparations obtained from said crude enzyme solutions by customary treatment such as precipitation with an organic solvent. Various other commercially available enzyme preparations may also be used with good results. These preparations which are used in the soy sauce production process employing an enzyme preparation are satisfactory. As a few examples of such enzyme preparations, mention may be made of α-amylase preparation, β-amylase preparation, alkali protease preparation, neutral protease preparation, and acid protease preparation.

The hydrolysis with enzyme preparations is generally carried out by adding, if necessary, water to the raw materials which have been preliminarily treated, and hydrolyzing the materials at about 30° to 60° C. in the presence of water and enzyme while gently stirring the mixture just to keep the substrates from settling. The sodium chloride concentration is kept preferably at 0 to 14% (W/V) during the hydrolysis reaction. The hydrolysis is carried out preferably under sterile conditions or at a relatively elevated temperature for about 10 to 80 hours.

The hydrolysis of raw materials in the form of soy sauce koji is performed by converting in a customary manner the raw materials into koji, adding to the koji water and, if necessary, an additional amount of raw materials, and hydrolyzing the mixture under the conditions similar to those in the case where hydrolysis is performed by use of enzyme preparations.

As a typical example of the method of chemical hydrolysis of raw materials, there may be mentioned a known procedure in which 3 to 10% hydrochloric acid is added to the raw materials, the resulting mixture is heated at about 70° C. or higher to effect hydrolysis, and the resulting acid hydrolyzate is neutralized with an alkali.

The reaction mixture formed by the enzymatic or chemical hydrolysis of raw materials is adjusted to pH 4.0 to 9.0, preferably 4.5 to 7.0, with a suitable alkali or acid, unless the original pH lies in said range.

When the hydrolyzate obtained as described above is a liquid containing no or substantially no hydrolysis residue (solids), it is used as such; otherwise the hydrolyzate is subjected to solid-liquid separation by means of pressing, filtration, centrifugation, or the like, before and/or after adjusting pH to 4.0–9.0 with an alkali or an acid to obtain a substrate in sap form. In the above solid-liquid separation, it is advantageous to preheat the hydrolyzate at about 60° to 100° C. for 0.5 to 30 minutes, thereby to markedly enhance the merit of solid-liquid separation.

The liquid hydrolyzate of raw materials adjusted to pH 4.0–9.0 (hereinafter such a hydrolyzate is referred to briefly as liquid hydrolyzate of raw materials) is then contacted with immobilized cells of soy sauce lactic acid bacteria (formed by the immobilization of soy sauce lactic acid bacteria) at an appropriate temperature such as, for example, about 20° to 35° C. for 30 minutes or more, preferably about 1 to 30 hours and preferably under anaerobic conditions, thereby to effect lactic fermentation. As examples of suitable soy sauce lactic acid bacteria, mention may be may of *Pediococcus halophilus* ATCC 13621, *Pediococcus halophilus* ATCC 13622, *Pediococcus halophilus* ATCC 13623, *Pediococcus halophilus* IAM 1678, *Pediococcus halophilus* IAM 1693, *Pediococcus halophilus* FERM-P No. 1414, *Pediococcus acidilactici* IFO 3885, *Pediococcus acidilactici* ATCC 8042, *Pediococcus acidilactici* ATCC 25743, *Tetracoccus soyae* FERM-P No. 1401, *Streptococcus faecium* ATCC 8043, *Streptococcus faecalis* ATCC 4082, *Streptococcus faecalis* ATCC 14428, *Lactobacillus delbrueckii* ATCC 9649, and *Lactobacillus casei* ATCC 7469. These bacteria are used each alone or in mixtures of two or more.

The techniques of the preparation of immobilized cells of lactic acid bacteria by immobilizing the above soy sauce lactic acid bacteria are described below.

The immobilization of soy sauce lactic acid bacteria cells may be performed by any of the customary methods such as method of entrapping with a polymer gel, method of physical adsorption and the like so long as the immobilized bacteria cells may still continue the growing in the given framework. The form of the immobilized preparation may be granular, fibrous or slice-like. As examples of the techniques of entrapping with a polymer gel among the above-mentioned methods of immobilizing lactic acid bacteria cells, mention may be made of the following.

(1) Method of entrapping with alginate gel: The method comprises suspending a culture liquor of soy sauce lactic acid bacteria or cells separated therefrom in a sodium alginate solution, dropping or extruding the suspension into a gelling agent such as a calcium chloride or aluminum sulfate solution, and processing the resulting gel into a suitable form.

(2) Method of entrapping with κ-carrageenan: The method comprises mixing an aqueous κ-carrageenan solution, which has been heated at about 40° C., with a soy sauce lactic acid bacteria culture liquor or cells separated therefrom, cooling the mixture, dropping or extruding the mixture into a gelling agent such as a solution of potassium chloride or ammonium chloride, and processing the gel into a suitable form.

(3) Method of entrapping with polyacrylamide gel: The method comprises suspending a culture liquor of soy sauce lactic acid bacteria or cells separated therefrom in a solution containing an acrylamide monomer, a crosslinking agent (e.g. N,N'-methylenebisacrylamide), a polymerization promoter (e.g. N,N,N',N'-tetramethylethylenediamine), and a polymerization initiator (e.g. potassium persulfate), polymerization under cooling of the suspension and processing the gel into a suitable form.

In the methods of entrapping with polymer gels, use may be made of other natural polymers such as gelatin, collagen, agar, albumin, starch, and powdered konjak, and synthetic polymers such as polyvinyl alcohol and photocuring resins.

As examples of the methods of physical adsorption, mention may be made of various methods in which the culture liquor of the soy sauce lactic acid bacteria or cells separated therefrom are contacted with and adsorbed on inorganic carriers such as porous glass beads, activated carbon, porous glass, alumina, silica gel, kaolinite, acid clay, calcium phosphate, metal oxides, carriers obtained by activation of these inorganic carries with glutaraldehyde; natural polymer carriers such as starch, gluten, and saw dusts; porous synthetic resins, and ceramics.

The immobilized cells of soy sauce lactic acid bacteria obtained by the procedures described above are placed in any of the various types of fermentation vessels such as, for example, stirred tank, packed tower, fluidized bed contactor, bubble column, and film reactor, and then the hydrolyzate of raw materials is fed to the vessel to effect fermentation. If the number of lactic acid bacteria cells in the immobilized soy sauce lactic acid bacteria cells is found insufficient after immobilization, the immobilized cells can be subjected to pre-propagation for a suitable time length under the conditions suitable for the growing of the cells, whereby growth of the immobilized cells will take place, and then the hydrolyzate of raw materials is contacted with the immobilized cells to undergo fermentation.

In the present process, the hydrolyzate, after contacting with the immobilized cells, can be transferred to the yeast fermentation step either directly or after having been passed through a filter. The filter used for this purpose may be any of the types capable of separating microbial cells, particularly the lactic acid bacteria cells. By using such a filter it is possible to obtain a lactic fermentation liquor substantially free from lactic acid bacteria cells. As examples of ultrafiltration membranes, mention may be made of SF 101 and SF 301 (Kuraray Engineering Co.), ACL-1050, AIL-1010, and SIP-1013 (Asahi Kasei Co.), HF-35 (Eastman Chemical Products Inc. U.S.A.), HFA 180 (Abcor Co., U.S.A.), Dia-Flo UM10 and Dia-Flo PM10 (Amicon Co., U.S.A.), Dia Filter-G10T and Dia-Filter-G05T (Bio Engineering Co.). SA-331 (Nippon Rosuiki Kogyo Co.) is an example of ceramic filters and D-160 (Shoketsu Kinzoku Kogyo Co.) is an example of sintered metal filters.

The lactic acid fermentation liquor obtained by contacting the hydrolyzate of raw materials with the immobilized soy sauce lactic acid bacteria cells for 30 minutes or more or said fermentation liquor after having been passed through a filler is then subjected to yeast fermentation as outlined previously to obtain a liquid seasoning. The methods of yeast fermentation are described below in detail.

In the method (1) of yeast fermentation, an ordinary yeast for soy sauce brewing or its culture liquor is added to the above lactic fermentation liquor, then the yeast fermentation is allowed to proceed in a customary manner of soy sauce brewing at 15° to 37° C. for 3 days or more, and, if necessary, the resulting fermentation liquor is subjected to solid-liquid separation treatment such as filtration or centrifugation to obtain a liquid seasoning.

As examples of the soy sauce yeasts, there may be listed *Saccharomyces rouxii* ATCC 13356, *Saccharomyces rouxii* ATCC 14679, *Saccharomyces rouxii* ATCC 14680, *Torulopsis nodaensis* ATCC 20189, *Torulopsis magnoliae* ATCC 13782, *Torulopsis etchellsii* ATCC 20190, *Torulopsis sphaerica* ATCC 13193 and *Torulopsis versatilis* ATCC 20191. These yeasts are used each alone or in mixtures of two or more.

In the method (2) of the yeast fermentation, the lactic fermentation liquor is introduced into a circulation fermenter, the above soy sauce yeast is inoculated into said fermentation liquor, and after 3 hours or more, preferably 5 to 48 hours, withdrawal of the fermentation mixture from the fermenter is started. At the same time, the lactic fermentation liquor is continuously fed to the fermenter so that the volume of fermentation mixture in the fermenter may remain approximately constant. After the start of withdrawing, the retention time of the fermentation mixture in the fermenter is adjusted to 3 hours or more. The fermentation mixture withdrawn from the fermenter is passed through a filter capable of removing the yeast cells to separate the withdrawn mixture into a liquid portion containing the yeast cells and a liquid seasoning containing no yeast cells, the former liquid portion being returned to the fermenter. The returning of the liquid portion containing yeast cells, which is separated by the filter, to the fermenter serves to increase the concentration of yeast cells in the fermenter, and the reducing sugar in the fed lactic fermentation liquor serves to increase markedly the efficiency of conversion into flavoring substances including alcohols. The circulation fermenter used is a fermenter provided with a liquid material feed pipe, a sterile air feed pipe, a stirrer, and a circulation route comprising a fermantation mixture discharge pipe, a filter, and a return pipe to return the fermentation liquor containing yeast cells to the fermenter.

The filter used in the above procedure may be any of the types capable of removing yeast cells in the fermentation mixture, such as, for example, ultrafilters and ceramic or sintered metal filters. As examples of ultrafilters, mention may be made of those provided with ultrafiltration membranes such as SF 101 and SF 301 (Kuraray Engineering Co.), ACL-1050 and SIP-1013 (Asahi Kasei Co.), HFA 100 and HFA 200 (Abcor Co., U.S.A.), Dia-Flo UM 10, and Dia-Flo PM 10 (Amicon Co., U.S.A.), Dia-Filter G10T and Dia-Filter G05T (Bio Engineering Co.). SA-331 (Nippon Rosuiki Kogyo Co.) is an example of ceramic filters and D-160 (Shoketsu Kinzoku Kogyo Co.) is an example of sintered metal filters.

In the method (3) of the yeast fermentation, a liquid seasoning is obtained by the yeast fermentation of the lactic fermentation liquor, which is carried out by contacting said lactic fermentation liquor with an immobilized soy sauce yeast cells placed in a fermentation vessel such as stirred tank, packed tower, fluidized bed contactor, bubble column, or film reactor. The contact time is generally one hour or more, preferably 2 to 30 hours. The process of fermentation can be optionally selected from continuous, semi-batch, and batch processes.

The immobilization of soy sauce yeast cells may be performed by any of the customary methods such as method of entrapping with a gel, method of adsoprtion and the like so long as the immobilized yeast cells may still continue the growing in the given framework. The form of the immobilized preparation may be granular, fibrous or slice-like. As examples of the techniques of entrapping with a gel among the above-mentioned methods of immobilizing soy sauce yeast cells, mention may be made of the following.

(1) Method of entrapping with alginate gel: This method comprises suspending a culture liquor of soy sauce yeast or cells separated therefrom in a sodium alginate solution, dropping or extruding the suspension into a gelling agent such as a calcium chloride or aluminum sulfate solution, and processing the resulting gel into a suitable form.

(2) Method of entrapping with κ-carrageenan: This method comprises mixing an aqueous κ-carrageenan solution, which has been heated at about 40° C., with a culture liquor of soy sauce yeast or cells separated therefrom, then cooling the mixture, dropping or extruding the mixture into a gelling agent such as a solution of potassium chloride or ammonium chloride, and processing the gel into a suitable form.

(3) Method of entrapping with polyacrylamide gel: This method comprises suspending a culture liquor of soy sauce yeast or cells separated therefrom in a solution containing an acrylamide monomer, a crosslinking agent (e.g. N,N'-methylenebisacrylamide), a polymesization promoter (e.g. N,N,N',N'-tetramethylethylenediamine) and a polymerization initiator (e.g. potassium persulfate), polymerization under cooling of the suspension, and processing the gel into a suitable form.

As examples of the methods of adsorption, mention may be made of those methods in which the culture liquor of soy sauce yeast or cells separated therefrom are adsorbed onto carriers such as, for example, porous glass beads, ceramics comprising various metal oxides, chips of polyvinyl chloride, and Raschig ring.

In the present process, it is possible to use as liquid seasoning the liquor obtained by contacting with the immobilized soy sauce yeast cells as such, or to improve the flavor by passing said liquor through a filter similar to that used in the yeast fermentation. Although the liquor obtained by soy sauce yeast fermentation as such or after passing through a filter can be used as a liquid seasoning, yet a seasoning product with more improved flavor is prepared, if necessary, by further ripening or suitable processing, filtration, pasteurization, and sediment separation.

As described above, according to this invention, it is possible to maintain the number of activated lactic acid bacteria cells at a high level during the lactic fermentation to increase markedly the efficiency of lactic fermentation, whereby the formation of flavor constituents such as organic acids, particularly lactic acid, is promoted and a liquid seasoning with excellent flavor is efficiently produced in a short period of time. This invention, therefore, is of great significance from the industrial point of view.

The invention is further illustrated below in detail with reference to Examples, but the invention is not limited thereto.

EXAMPLE 1

A mixture of 18 kg of defatted soybean and 4 kg of wheat was sprinkled with 30 liters of water, then heated in a cooker for 45 minutes by saturated steam at pressure of 1.1 kg/cm$^2$(G), and cooled down. On the other hand, *Aspergillus oryzae* ATCC 20386 (obtained from Noda Institute for Scientific Research) was inoculated into 10 kg of wheat bran, which has been denatured by heating in a customary manner, and made into koji at 30° to 35° C. for 42 hours, yielding a solid koji. An enzyme solution prepared by extracting the solid koji with five times of cold water was preliminary filtered through a filter press and further filtered by means of a sterile filter (type 5A-451 of Nippon Rosuiki Kogyo Co.) to obtain a sterile enzyme solution. Into a decomposition tank, 90 liters in volume and provided with a hot water jacket, were transferred 30 liters of the sterile enzyme solution and the total quantity of the above cooled raw materials. While being stirred by paddle-type impeller at 30 rpm, the mixture was subjected to enzymolysis at a constant temperature of 42° C. for 64 hours. To the resulting hydrolyzate was added 6 kg of sodium chloride [sodium chloride concentration: 8.5% (W/V)]. The mixture was heated to 80° C., then cooled down, and pressed to obtain 60 liters of an enzymolysis liquor (pH 5.45).

A culture liquor was prepared by the stationnary culture (30° C., 6 days) of *Pediococcus halophilus* IAM 1693 (obtained from Institute of Applied Microbiology, University of Tokyo), a soy sauce lactic acid bacteria, in a liquid medium for lactic acid bacterial culture (pH 7.0) containing 10% (V/V) of unpasteurized soy sauce, 1% (W/V) of glucose, 8% (W/V) of sodium chloride, 3.5% (W/V) of sodium acetate, and 0.3% (W/V) of yeast extract. To 10 liters of a 2-% sodium alginate solution, was added 200 ml of the above culture liquor. The mixture was thoroughly mixed to form a lactic acid bacterial suspension (total cell number: $7.9 \times 10^6$/ml). The suspension was added dropwise to a 2-% calcium chloride solution in a column, 14 cm in internal diameter and 100 cm in height, through 16 nozzles, 2 mm in internal diameter, disposed at the top of the column, while cooling the column by a cold water jacket and stirring the mixture by feeding nitrogen through the bottom at a rate of 400 ml/minute, thereby to form spherical gel granules, about 4 mm in diameters, containing immobilized lactic acid bacteria. The gel granules were left standing in the column for 24 hours to undergo cooling and hardening. The calcium chloride solution in the column was then withdrawn, leaving behind a layer, 36 cm in depth, of gel granules containing immobilized bacterial cells. The gel was rinsed three times with the enzymolysis liquor and the vacant space of the column was filled with the enzymolysis liquor. The column was kept at 30° C., while feeding nitrogen through the bottom at a rate of 300 ml/minute, to allow the lactic acid bacteria to grow. After 24 hours of no liquor feeding, the column was fed with the enzymolysis liquor at a rate of 500 ml/hour for 48 hours, whereby the number of living lactic acid bacterial cells in the gel was increased to $2.2 \times 10^9$/ml. The feeding rate of the enzymolysis liquor was then adjusted to 650-900 ml/hour (the average retention time on the bais of empty column: 17.1-23.7 hours). The enzymolysis liquor was allowed to pass in contact with the gel containing immobilized lactic acid bacterial cells. There was continuously obtained a lactic fermentation liquor [total nitrogen (TN): 1.95% (W/V); reducing sugar (RS): 8.39% (W/V); sodium chloride: 8.50% (W/V); pH 4.87; total acidity (TA): 2.93].

A soy sauce yeast, *Saccharomyces rouxii* ATCC 13356 (obtained from American Type Culture Collection), was cultured at 30° C. for 60 hours under aeration in a liquid medium for yeast culture [10% (V/V) unpasteurized soy sauce, 7% (W/V) glucose, 8% (W/V) sodium chloride, 0.1% (W/V) monopotassium phosphate, 0.01% (W/V) calcium chloride, 0.1% (W/V) yeast extract, pH 5.0]. To 10 liters of a 2-% (W/V) sodium alginate solution, was added 200 ml of the yeast culture liquor. The mixture was thoroughly mixed to form a yeast suspension (total number of cells: $5.7 \times 10^6$/ml). The suspension was added dropwise to a 2-% calcium chloride solution in a column, 14 cm in internal diameter and 100 cm in height, through 16 nozzles, 2 mm in internal diameter, disposed at the top of the column, while cooling the column by a cold water jacket and stirring the mixture by feeding sterile air through the bottom at a rate of 400 ml/minute, thereby to form spherical gel granules, about 4 mm in diameter, containing immobilized yeast cells. The gel granules were left standing in the column for 24 horus to undergo cooling and hardening. The calcium chloride solution in the column was then withdrawn, leaving behind a layer of gel granules containing immobilized yeast cells, the total depth of the layer being 41 cm. The gel containing immobilized yeast was rinsed three times with the enzymolysis liquor and the vacant space of the column was filled with the enzymolysis liquor. The column was kept at 30° C., while feeding sterile air through the bottom at a rate of 300 ml/minute, to allow the yeast cells to grow. After 24 hours of no liquor feeding, the column was fed with the lactic fermentation liquor at a rate of 360 ml/hour for 48 hours, whereby the number of living yeast cells in the gel was increased to $3.5 \times 10^8$/ml. The feeding rate of the lactic fermentation liquor was then adjusted to 530-850 ml/hour (the average retention time on the basis of empty column: 18.1-29.0 hours). The lactic fermentation liquor was allowed to pass in contact with the gel containing immobilized yeast cells. There was continuously obtained a liquid seasoning of good flavor and taste. The results of analysis of the liquid seasoning thus obtained were as shown below.

1. General analysis: 1.94% (W/V) TN, 1.93% (W/V) RS, 2.74% (V/V) alcohols, 3.10 TA, pH 4.78.
2. Flavor constituent (as determined by gas chromatography): 6 ppm n-propyl alcohol, 28 ppm isobutyl alcohol, 3 ppm n-butyl alcohol, 107 ppm isoamyl alcohol, 7 ppm acetoin, 2 ppm ethyl lactate, 9 ppm furfural, 29 ppm furfuryl alcohol, 7 ppm methionol, 1 ppm benzyl alchol, 73 ppm β-phenylethyl alcohol, 2 ppm 2-acetylpyrrole.
3. Organic acid: 1.07% (W/V) lactic acid, 0.23% (W/V) acetic acid, 0.01% (W/V) formic acid, 0.02% (W/V) malic acid, 0.35% (W/V) citric acid, 0.02% (W/V) succinic acid.

EXAMPLE 2

To a mixture of 4.5 kg of defatted soybean and 4.2 kg of wheat, was added 4.5 liters of water. The mixture was heated in a closed vessel, 60 liters in volume, for 30 minutes by saturated steam at pressure of 1 kg/cm²(G). The heated mass was thoroughly unravelled, then further heated for 45 mintues by saturated steam at pressure of 1 kg/cm²(G), and cooled down. A solution of commercial enzyme preparations was prepared by dissolving in 20 liters of water 50 g of α-amylase (Sankyo Co.), 50 g of β-amylase (Nagase Co.), 50 g of alkali protease (Nagase Co.), 50 g neutral protease (Seikagaku Kogyo Co.), and 50 g of acid protease (Seishin Seiyaku Co.). The enzyme solution was filtered through a sterile filter (type SA-451 of Nippon Rosuiki Kogyo Co.) to obtain a sterile emzyme solution. To the total quantity of the above cooled raw materials, was added 13.8 liters of the sterile anzyme solution. The mixture was subjected to enzymolysis by heating at 40° C. for 48 hours with shaking. To the resulting hydrolyzate, was added 2.4 kg of sodium chloride [NaCl concentration: 10% (W/V)]. The mixture was pressed to collect 21.5 liters of an enzymolysis liquor (pH 5.60).

A culture liquor was prepared by the stationary culture (30° C., 6 days) of *Pediococcus halophilus* ATCC 13621 (obtained from American Type Culture Collection), a soy sauce lactic acid bacteria, in a liquid medium for lactic acid bacterial culture of the same composition as described in Example 1. To one liter of a 2-% sodium alginate solution, was added 20 ml of the culture liquor. The mixture was thoroughly mixed to form a lactic acid bacterial suspension (total cell number: $8.1 \times 10^6$/ml). Using a metering pump, the lactic acid bacterial suspension was added dropwise to a 2-% calcium chloride solution while being cooled in an ice bath and gently stirred, thereby to prepare spherical granules of gel, about 4 mm in diameter, containing immobilized lactic acid bacteria. The gel was hardened by cooling for 24 hours. A portion (330 ml) of the gel was transferred into a column, 5.4 cm in internal diameter and 44 cm in height, and rinsed three times with the above-enzymolysis liquor. After filling the vacant space of the column with the above enzymolysis liquor, the column was maintained at 30° C. for 48 hours, while feeding nitrogen through the bottom at a rate of 80 ml/minute, to allow the lactic acid bacteria to grow (the number of living lactic acid bacteria cells: $2.8 \times 10^9$/ml). The enzymolysis liquor was fed through the bottom at a rate of 70 ml/hour to allow the fermentation to proceed at 30° C. The average retention time on the basis of empty column was 14.4 hours {[the volume of empty column (1008 ml)]÷[the feeding rage of enzymolysis liquor (70 ml/hour)]}. The enzymolysis liquor was allowed to pass in contact with the gel containing immobilized lactic acid bacterial cells and there was continuously obtained a lactic fermentation liquor of good flavor and taste [1.86% (W/V) TN, 10.20% (W/V) RS, 10.05% (W/V) NaCl, pH 4.81, 3.00 TA].

Into a circulation fermenter, 1,000 ml in volume, provided with a liquid material feed pipe, a sterile air feed pipe, a stirrer, and a circulation route comprising a fermentation liquor outlet pipe, an ultrafilter (described later), and a return pipe to return the liquor containing yeast cells to the fermenter, was charged 700 ml of the above lactic fermentation liquor. A yeast culture liquor obtained by the shaken culture (30° C., 60 hours) of *Torulopsis versatilis* ATCC 20191 (deposited in American Type Culture Collection in June 19, 1980 by Kikkoman Corp.) in a liquid medium for yeast culture of the same composition as described in Example 1 was inoculated into the liquor in the above fermenter so that the number of total yeast cells may become $8.5 \times 10^7$/ml. While feeding sterile air at a rate of 0.7 times the volume of fermentation liquor per minute and stirring at 100 rpm, the yeast cells were allowed to grow at 30° C. After 25 hours from the inoculation of yeast when the number of total yeast cells reached $1.8 \times 10^9$/ml, the circulation of the fermentation liquor was started. The fermentation liquor from the outlet of the fermenter was continuously sent to an ultrafilter provided with an ultrafiltration membrane SIP-1013 (Asahi Kasei Co.), whick was disposed in the circulation route, to separate the fermentation liquor into a liquid portion containing yeast cells and a liquid seasoning portion containing no yeast cells. The quantity of the liquid seasoning collected from the ultrafilter was adjusted to 45 ml/hour [retention time of the fermentation liquor in the fermenter=700 ml ÷(45 ml/hour) =15.6 hours]. The liquor containing yeast cells was returned to the fermenter through the return pipe at a rate of 200 ml/minute, while the lactic fermentation liquor was fed to the fermenter through the liquid material feed pipe at a rate of 45 ml/hour to allow the fermentation to proceed continuously and to collect continuously a liquid seasoning rich in flawor and taste.

The results of analysis of the liquid seasoning thus obtained were as shown below.

1. General analysis: 1.85% (W/V) TN, 2.83% (W/V) RS, 3.03% (V/V) alcohols, 3.02 TA, 1.31% (W/V) lactic acid, 0.27% (W/V) acetic acid, pH 4.85.

2. Flavor constituent (as determined by gas chromatography): 4 ppm n-propyl clocohol, 26 ppm isobutyl alcohol, 1 ppm n-butyl alcohol, 86 ppm isoamyl alcohol, 4 ppm acetoin, 4 ppm furfural, 5 ppm methionol, 4 ppm benzyl alcohol, 60 ppm β-phenylethyl alcohol, 2 pp 2-acetylpyrrole, 5 ppm 4-ethylguaiacol.

EXAMPLE 3

Defatted soybeen (5 kg) was decomposed with 20 liters of 6-% hydrochloric acid by heating at 100° C. for 24 hours. The decomposition mixture was neutralized with sodium carbonate to pH 5.7. Sodium chloride was dissolved with thorough mixing in the neutralized mixture. The resulting neutralized acid decomposition mixture (pH 5.70) was filtered with the addition of diatomacceous earth and admixed with glucose to make RS 8% (W/V) to obtain an adjusted liquid material. *Pediococcus halophilus* ATCC 13621 (obtained from American Type Culture Collection), a soy sauce lactic acid bacteria, was stationarily cultured in the same liquid medium for lactic acid bacteria culture as described in Example 1 at 30° C. for 6 days. The culture liquor was centrifuged at 12,000 rpm for 15 minutes to obtain moist lactic acid bacterial cells. The cells and porous silica beads (Spherosil XOB-015 $NH_2$ of Rhone Poulenc Co.) were suspended in the above lactic acid bacteria culture medium and left standing for one hour at room temperature to adsorb and immobilize the lactic acid bacterial cells on the silica beads. The resulting beads were rinsed 3 times with the above lactic acid bacteria culture medium. A portion (100 ml) of the rinsed beads was packed in a column, 2 cm in internal diameter and 40 cm in height. The adjusted liquid material was fed to the top of column at a rate of 10 ml/hour to allow the fermentation to proceed at 28° C. The average retention time of the fermentation liquor in the column was adjusted to 12.5 hours on the basis of empty column {[volume of empty column (125 ml)]÷[feed rate of liquid material (10 ml/hour)]}. The adjusted liquid material was allowed to pass through the column in contact with the silica beads and there was continuously obtained a lactic fermentation liquor having good flavor and taste [1.85% (W/V) TN, 8.04% (W/V) RS, 9.72% (W/V) NaCl, pH 4.95, 2.68 TA].

*Saccharomyces rouxii* ATCC 14679 (obtained from American Type Culture Collection), a soy sauce yeast, was cultured under aeration at 30° C. for 60 hours in the same liquid medium for yeast culture as described in Example 1. A portion (30 ml) of the culture liquor was added to 10 liters of the lactic fermentation liquor and stirred for 2 days at 28° C. under aeration at a rate of 2.5 liters/minute. Then the aeration was discontinued and the fermentation was allowed to proceed for 5 days to yield a liquid seasoning of excellent flavor and taste.

The results of analysis of the liquid seasoning thus obtained were as shown below.

1. General analysis: 1.83% (W/V) TN, 1.56% (W/V) RS, 2.93% (V/V) alcohols, 2.79 TA, pH 4.89.

2. Flavor constituent (as determined by gas chromatography): 4 ppm n-propyl alcohol, 24 ppm isobutyl alcohol, 1 ppm n-butyl alcohol, 80 ppm isoamyl alcohol, 4 ppm acetoin, 1 ppm ethyl lactate, 4 ppm furfural, 17 ppm furfuryl alcohol, 2 ppm methionol, 1 ppm benzyl alcohol, 69 ppm β-phenylethyl alchol, 1 ppm 2-acethylpyrrole.

COMPARATIVE EXAMPLE 1

A liquid seasoning was prepared in the same manner as in Example 1, except that a lactic acid bacteria culture liquor (number of total lactic acid bacteria cells: $2.2 \times 10^7$/ml) was added in place of the immobilized lactic acid bacteria cells to the enzymolysis liquor of raw materials for soy sauce production and the lactic fermentation was allowed to proceed at 30° C. for 120 hours under anaerobic condition. The results of analysis of the liquid seasoning thus obtained were shown in the following table in comparison with those obtained in Example 1. It is seen from the results shown in the table that as compared with the procedure of Comparative Example 1, wherein a lactic acid bacterial culture liquid was used in place of the immobilized bacteria cells, the procedure of Example 1, wherein immobilized lactic acid bacteria cells were used, has advantages in that the lactic fermentation time is as short as about one-sixth and the product liquid seasoning contains larger amounts of organic acids which are flavor and taste constituents.

TABLE

| | Example 1 | Comparative Example 1 |
|---|---|---|
| General analysis | | |
| TN % (W/V) | 1.94 | 1.94 |
| RS % (W/V) | 1.93 | 1.95 |
| Alcohols % (V/V) | 2.74 | 2.65 |
| TA | 3.10 | 2.15 |
| pH | 4.78 | 4.91 |
| Assay of organic acid | | |
| Lactic acid % (W/V) | 1.07 | 0.74 |
| Acetic acid % (W/V) | 0.23 | 0.15 |
| Formic acid % (W/V) | 0.01 | 0.01 |
| Malic acid % (W/V) | 0.02 | 0.01 |
| Citric acid % (W/V) | 0.35 | 0.22 |
| Succinic acid % (W/V) | 0.02 | 0.02 |
| Flavor constituent | | |
| n-Propyl alcohol ppm | 6 | 5 |
| Isobutyl alcohol ppm | 28 | 27 |
| n-Butyl alcohol ppm | 3 | 2 |
| Isoamyl alcohol ppm | 107 | 98 |
| Acetoin | 7 | 6 |
| Ethyl lactate ppm | 2 | 2 |
| Furfural ppm | 9 | 7 |
| Furfuryl alcohol ppm | 29 | 26 |
| Methionol ppm | 7 | 6 |
| Benzyl alcohol ppm | 1 | 1 |
| β-Phenylethyl alc. ppm | 73 | 70 |
| 2-Acetylpyrrole ppm | 2 | 2 |
| Lactic fermentation time (hour) | 17.1–23.7 | 120 |

What is claimed is:

1. A process for producing a liquid seasoning, which comprises contacting a hydrolyzate of soy sauce raw materials, in liquid state at a pH of 4.0 to 9.0, with immobilized cells of soy sauce lactic acid bacteria for 30 minutes or more to obtain a lactic fermentation mixture, said hydrolyzate having been obtained by enzymolysis or chemical hydrolysis of said soy sauce raw materials which are proteinaceous materials selected from the group consisting of defatted soybean, whole soybean, wheat gluten, corn gluten, purified soybean protein, separated soluble protein, fish and shellfish, meat, and yeast extract, admixed with starchy material selected from the group consisting of wheat, barley and corn, and then subjecting said lactic fermentation mixture to a fermentation by a soy sauce yeast to obtain a liquid seasoning.

2. A process according to claim 1, wherein the fermentation of the lactic fermentation mixture by the soy sauce yeast is performed by contacting said lactic fermentation mixture with immobilized cells of soy sauce yeast for one hour or more.

3. A process according to claim 1, wherein the fermentation of the lactic fermentation mixture by the soy sauce yeast is performed by adding the soy sauce yeast to the lactic fermentation mixture, allowing the fermentation to proceed for 3 hours or more, then while continuously withdrawing the fermentation mixture from the fermenter, feeding continuously the lactic fermentation mixture to the fermenter at a rate to keep the average retention time of the fermentation mixture in the fermenter at 3 hours or more, passing the fermentation mixture withdrawn from the fermenter through a filter to separate the mixture into a liquid portion containing the yeast cells and a liquid seasoning portion containing no yeast cells, and returning the former liquid portion containing the yeast cells to the fermenter.

4. A process according to claim 1, wherein the contact of the liquid hydrolyzate with the immobilized cells of soy sauce lactic acid bacteria is conducted for 1 to 30 hours.

5. A process according to claim 1, wherein the contact of the liquid hydrolyzate with the immobilized cells of soy sauce lactic acid bacteria is conducted under anaerobic conditions.

6. A process according to claim 1, wherein the contact of the liquid hydrolyzate with the immobilized cells of soy sauce lactic acid bacteria is conducted at 20° to 35° C.

7. A process according to claim 1, wherein the fermentation of the lactic fermentation mixture by the soy sauce yeast is conducted at 15° to 37° C.

8. A process according to claim 2, wherein the contact of the lactic fermentation mixture with the immobilized cells of soy sauce yeast is conducted for 2 to 30 hours.

9. A process according to claim 3, wherein the average retention time of the fermentation mixture is 5 to 48 hours.

* * * * *